Figure 1:
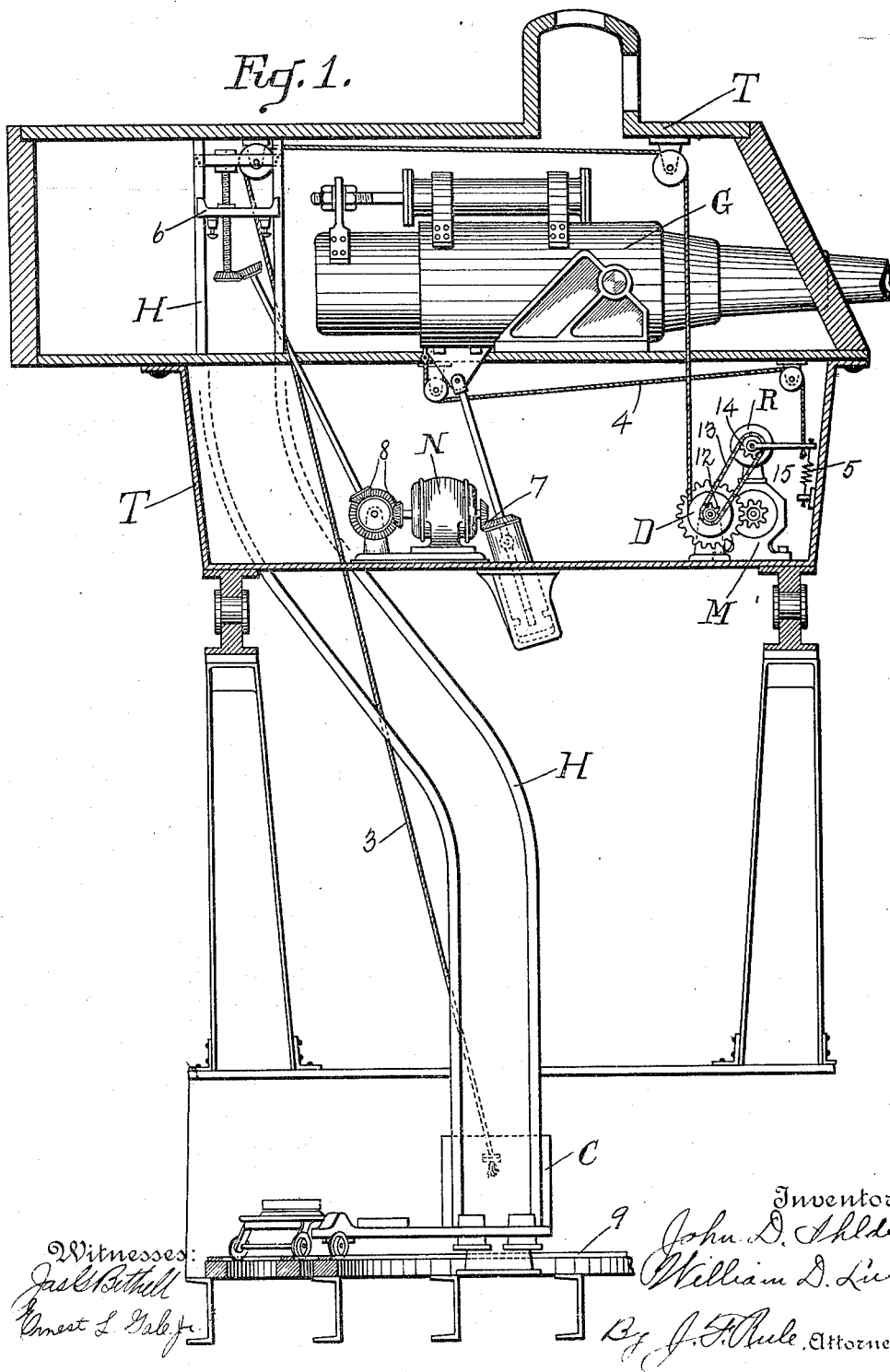

J. D. IHLDER & W. D. LUTZ.
MOTOR CONTROLLING APPARATUS.
APPLICATION FILED FEB. 12, 1910.

1,040,339.

Patented Oct. 8, 1912.
2 SHEETS—SHEET 1.

Witnesses:
Jas. C. Bethell
Ernest L. Gale Jr.

Inventors
John D. Ihlder
William D. Lutz
By J. F. Rule, Attorney.

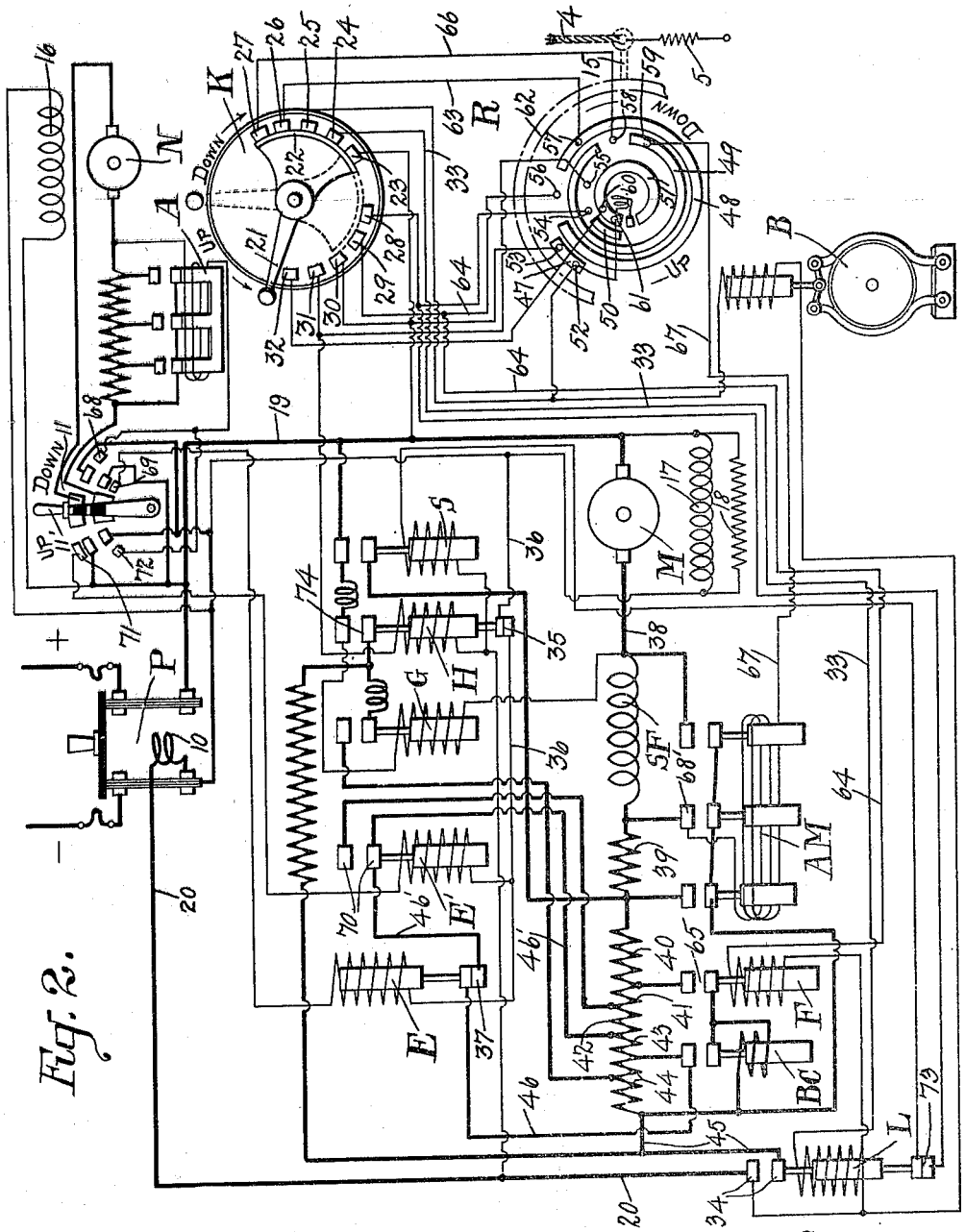

UNITED STATES PATENT OFFICE.

JOHN D. IHLDER, OF NEW YORK, N. Y., AND WILLIAM D. LUTZ, OF ALLENDALE, NEW JERSEY, ASSIGNORS TO OTIS ELEVATOR COMPANY, OF JERSEY CITY, NEW JERSEY, A CORPORATION OF NEW JERSEY.

MOTOR-CONTROLLING APPARATUS.

1,040,339.  Specification of Letters Patent.  Patented Oct. 8, 1912.

Application filed February 12, 1910. Serial No. 543,601.

*To all whom it may concern:*

Be it known that we, JOHN D. IHLDER and WILLIAM D. LUTZ, citizens of the United States, residing in New York, county and State of New York, and borough of Allendale, county of Bergen, State of New Jersey, respectively, have invented a new and useful Improvement in Motor-Controlling Apparatus, of which the following is a specification.

Our invention relates to motor controlling apparatus more particularly designated and described as motor controlling apparatus for ammunition hoists.

This invention relates to hoisting apparatus in which a carrier is raised to a certain position by the carrier motor, and as this position is thereafter changed, the torque of the said motor is automatically increased or decreased.

One of the objects of the invention is to provide means for varying the torque of the carrier motor.

Another object is to provide means for automatically controlling the current supplied to one motor by the coöperative action of another motor.

Other new and useful objects will hereinafter appear, the novel features being pointed out in the appended claims.

Referring now to the accompanying drawings, Figure 1 is a cross section of a turret containing the essential devices of our invention, showing their mechanical connections; Fig. 2 is a diagrammatic representation showing the electrical circuits and connections.

Referring more particularly to Fig. 1, our invention will be described in connection with an ammunition hoist for a breech loading gun G which is mounted in the gun turret T. The hoistway H is so disposed as to provide a guide way for the carrier C from the lower floor 9 to a position opposite the breech of the gun G. This position is automatically limited by the buffer 6 which is moved up or down in accordance with the breech of the gun G. The motors M and N will be respectively designated as the carrier motor and the gun motor. The gun motor N is provided with suitable mechanical connections, such as the gears 7, 8, for raising and lowering the breech of the gun G and the buffer device 6. A flexible cable 3 is attached to the carrier C and is wound about the drum D by means of a geared connection with the carrier motor M, to raise the carrier C. The sprocket wheels 12, 14 are joined by the sprocket chain 13, and the regulator R is thereby rotated in accordance with the movement of the drum D. The arm 15 which controls the positions of the contacts of the regulator R is automatically adjusted by means of a flexible cable 4 attached to the gun G, and by the spring 5. The function of the regulator is automatically to control the operation of the carrier motor M in raising and lowering the carrier C.

In Fig. 2 the electrical circuits and connections relate to the same apparatus shown by Fig. 1. The gun motor N is controlled by means of the manual switch 11, and is provided with the field winding 16 and the accelerating magnet A. The controller K effects the rotation of the carrier motor M in a direction to raise or lower the carrier, and the regulator R automatically effects certain changes in the circuits hereinafter set forth. Various electromagnetic devices are employed in controlling the operation of the carrier motor M; the line magnet L, accelerating magnet AM, balancing current magnet BC, fast speed magnet F, magnets E and E', slow down magnet S, and load magnets G and H. The field winding 17 and field winding resistance 18 for the motor M are connected to receive current as soon as the automatic switch P is closed. This switch P connects the motor leads 19 and 20 to the supply mains + and −, and is automatically opened when a predetermined current flows in the coil 10.

Our invention is most readily understood by describing the action of an embodiment thereof. The ammunition is ordinarily loaded on the carrier at a lower level and the carrier raised by means of the carrier motor M to a position opposite the breech of the gun G. This invention particularly relates to the current supplied to the carrier motor M when the carrier is in the raised position. To raise the carrier the hand lever 21 of the controller K is turned from the central position in the "up" direction to take the full line position shown by Fig. 2. In such position the contact plate 22 makes connection with the contacts 23, 24, 25, 26, 27. Contact 23 is directly connected to the main lead 19. As soon as contact 24 is touched by the contact plate 22 a circuit is closed through the winding of the line magnet L by way of conductor 33 to the other main lead 20. This causes the contacts 34 to be joined, thereby completing a circuit through the armature of the carrier motor M. This circuit may be traced from the main lead 19 through the armature of the motor M, conductor 38, series field SF, resistances 39, 40, 41, 42, 43, 44, conductor 45, and contacts 34 to the main lead 20. When the contact plate 22 connects with contact 25, current is led through the magnet winding of the brake B which causes the brake to be released and the motor M is therefore free to rotate in the desired direction.

The regulator R comprises contact rings 47, 48, 49, 50, 51 and contacts 52, 53, 54, 55, 56, 57, 58, 59, 60 and 61 for making electrical connections therewith. The said contact rings are rotated in accordance with the rotation of the carrier motor M by such mechanical means as the chain 13 and sprocket 14 shown in Fig. 1. The contacts 52, 53, 56, 57, 58 and 59 are secured to the contact holder 62 and when the gun G (Fig. 1) is moved up or down, the relative position of the contact holder 62 and the said contacts is also changed by means of the arm 15, the flexible cable 4 and the spring 5. It is not necessary to change the position of the other contacts, for they are employed principally in the downward movement of the carrier. Thus the various circuits through the contact rings 47, 48 and 49 are changed earlier or later in accordance with the position of the gun and of the corresponding regulator contacts. The contact rings of the regulator R shown by Fig. 2 are rotated slightly less than a complete revolution for the extreme movement of the ammunition carrier from the bottom to the top of the guideway. In the position shown by Fig. 2, the contact rings of the regulator R are at the upper limit; that is, the ammunition carrier has been raised to a position opposite the breech of the gun.

To proceed with the explanation of the raising of the carrier by the carrier motor M: When the carrier is at or near the bottom of the guide way, both contacts 56 and 57 will be in contact with the contact ring 48, and as soon as the contact plate 22 of the controller K makes connection with contact 26, a current is led through conductor 63, contact 57, contact ring 48, contact 56, conductor 64, winding of the fast speed magnet F and thence to the other main lead 20, thereby uniting contacts 65 and placing the series resistances 41, 42 and 44 in parallel with the winding of the balancing magnet BC, and thus allowing more current to flow through the armature of the motor M. Resistance 43 is normally shortcircuited by means of the conductors 46 and 46' and the contacts 37 of the magnet E. When the contact ring 49 makes connection with both contacts 58 and 59, and the contact plate 22 strikes the contact 27, a current is led thereby and by means of the conductors 66 and 67, through the winding of the accelerating magnet AM to the contact 68' which magnet thereupon successively short-circuits the winding of the balancing current magnet BC and the resistance 40, the resistance 39, and the series field SF, to accelerate the motor M. When the carrier nears the breech of the gun the contacts 56 and 58 slip off of their respective contact rings 48 and 49 and break the circuits through the fast speed magnet F and the accelerating magnet AM, thus re-inserting the series field SF, the resistances 39, 40, 41, 42 and 44 in circuit with the armature of the motor M. This brings the carrier up against the buffer device 6 (Fig. 1) at the breech of the gun, the carrier motor M having enough torque to retain the carrier in this position. It is at this point that our invention is applicable; if after the carrier has been raised to a position opposite the breech of the gun, it becomes necessary to elevate or depress the breech of the gun, it is desirable that the carrier should follow the movement thereof. To accomplish this without employing a gun motor of sufficient power to counteract the torque of the carrier motor, and to economize the current consumption, we employ the resistances 43 and 42, and the magnets E and E'. The magnet E is not normally energized and the contacts 37 controlled thereby short-circuit the resistance 43. The magnets E and E' which effect the insertion and short-circuiting of the resistances 43 and 42 respectively, are controlled by means of the auxiliary contacts 69 and 71 of the manual switch 11 of the gun motor N, and by the contacts 35 controlled by the magnet H. The common return conductor 36 is connected through the contacts 35 to the negative main, and to one terminal of the magnet windings of each of the magnets E and E'. The other terminals of the said windings are connected to the auxiliary contacts 69 and 71 in such a manner that the magnet E is energized only when the hand lever 11' of the manual switch 11 is turned in a direction to cause the gun motor N to lower the breech of the gun, and the magnet E' is energized only when the hand lever 11' is turned in a direction to cause the gun motor to raise the breech of the gun. In the former case, the energization of the magnet E causes the separation of the contacts 37 and the insertion of the resistance 43 in circuit with the carrier motor M. In the latter case the energization of the magnet E' causes the contacts 70 to be joined and the resistance 42 normally in circuit with the carrier motor M, to be shortcircuited.

When resistance is placed in circuit with the carrier motor M the current through the motor armature is reduced and the torque correspondingly decreased; the opposite effect is produced when a portion of the resistance is shortcircuited. The results of these actions are, that the carrier motor M receives more current, to raise the ammunition carrier in accordance with the upward movement of the breech of the gun when the magnet E' is energized, and receives less current when the breech of the gun is lowered and the magnet E is energized. Since the buffer device 6 (Fig. 1) is raised or lowered in accordance with the movement of the breech of the gun, the movement of the ammunition carrier C, correspondingly is effected with an increase or decrease of current in the carrier motor. Thus it is seen that the carrier motor M raises the carrier C to a position opposite the breech of the gun G with a torque sufficient to hold the carrier C in its raised position. If the breech of the gun G is raised thereafter by the gun motor N, the magnet E' is energized and the resistance 42 is shortcircuited, thereby allowing more current to flow through the armature of the motor M, which therefore operates to raise the carrier in accordance with the upward movement of the breech of the gun and of the buffer 6. If, on the other hand, the breech of the gun is depressed by the gun motor N, the magnet E is energized and the resistance 43 is inserted to restrict the passage of current through the armature of the carrier motor M. The economy and facility of such operation is very evident, since no more current is used at any time than is actually necessary, and the current supply is automatically varied in accordance with the operation of the gun motor without the attention of the operator of either motor being directed thereto.

The apparatus shown by Fig. 2 is of a type in which the ammunition carrier descending by reason of its own weight causes the armature of the carrier motor M to rotate, and the motor to act as a generator, with local armature circuits to constitute an electrodynamic brake therefor. Our present invention is not concerned in this operation further than in the fact that the magnet H, which operates as soon as the hand lever 21 is turned to the "down" position, separates the contacts 35¹ by such operation and prevents current being supplied to either of the magnets E or E'. The load magnet G operates automatically to vary the resistance in the local armature circuits, thereby limiting the speed of the carrier motor M, and of the carrier in its downward course.

It is to be noticed that one feature of our invention is accomplished by the use of a magnet switch normally closed, and another feature by the use of a magnet switch normally open. By the present arrangement, the resistances do not prevent the carrier motor M from attaining its full speed in raising the ammunition carrier.

While we have thus specifically described our invention it is evident that various changes may be made by those skilled in the art without departing from the spirit and scope of the invention.

What we claim and desire to secure by Letters Patent of the United States, is:—

1. In ordnance apparatus, the combination of an ammunition carrier, a motor for raising the carrier, a gun, a motor for raising or lowering the breech of the gun, and means for increasing the torque of the carrier motor when the other motor is operated to raise the breech of the gun.

2. In ordnance apparatus, the combination of an ammunition carrier, a motor for raising the carrier, a gun, a motor for raising or lowering the breech of the gun, and means for automatically increasing the torque of the carrier motor when the other motor is operated to raise the breech of the gun.

3. In ordnance apparatus, the combination of an ammunition carrier, a gun, a motor for raising the carrier, a motor for raising or lowering the breech of the gun, and means dependent upon the energization of the gun motor to raise the breech of the gun for increasing the torque of the carrier motor.

4. In ordnance apparatus, the combination of an ammunition carrier, a gun, a motor for raising the carrier, a motor for raising or lowering the breech of the gun, and means dependent upon the energization of the gun motor to raise the breech of the gun for automatically increasing the torque of the carrier motor.

5. In ordnance apparatus, the combination of an ammunition carrier, a gun, a motor for raising the carrier, a motor for raising or lowering the breech of the gun, mechanism for effecting said operations of the gun motor, means for automatically increasing the torque of the carrier motor when the said mechanism is operated to cause the gun motor to raise the breech of the gun, and means for automatically decreasing the torque of the carrier motor when said mechanism is operated to cause the gun motor to lower the breech of the gun.

6. In ordnance apparatus, the combination of an ammunition carrier, a gun, a motor for raising the carrier, a motor for raising or lowering the breech of the gun, a switch for effecting the operation of the gun motor in either direction, and means in connection with the switch whereby the torque of the carrier motor is increased when said switch is operated to cause the breech of the gun to be raised, and is decreased when the switch is operated to cause the breech of the gun to be lowered.

7. In ordnance apparatus, the combination of an ammunition carrier, a gun, a motor for raising the carrier, a motor for raising or lowering the breech of the gun, controlling mechanism for the gun motor, resistance in circuit with the carrier motor, and means for automatically short-circuiting a portion of the resistance in circuit with the carrier motor when the said controlling mechanism is operated to cause the breech of the gun to be raised by the gun motor.

8. In ordnance apparatus, the combination of an ammunition carrier, a gun, a motor for raising the carrier, a motor for raising or lowering the breech of the gun, a switch for effecting the operation of the gun motor in either direction, sectional resistance for the carrier motor, means in connection with the switch for reducing the resistance in circuit with the carrier motor when the breech of the gun is raised, and separate means in connection with the said switch for increasing the resistance in circuit with the carrier motor when the breech of the gun is lowered.

9. In ordnance apparatus, the combination of an ammunition carrier, a gun, a motor for raising the carrier, a motor for raising or lowering the breech of the gun, a controller switch for the carrier motor, an automatic regulator for stopping the carrier opposite the breech of the gun, controlling mechanism for the gun motor, means associated with said mechanism for varying the current supplied to the carrier motor when said mechanism is operated to cause the gun motor to change the position of the breech of the gun after the carrier has been raised to a position opposite the breech of the gun.

10. In ordnance apparatus, the combination of an ammunition carrier, a gun, a motor for raising the carrier, a motor for raising or lowering the breech of the gun, a controller switch for the carrier motor, a regulator automatically varied in accordance with the movement of the breech of the gun up or down, means whereby the carrier is brought to rest opposite the breech of the gun and held there by the carrier motor with a certain torque, controlling mechanism for the gun motor, and separate means in conjunction with said mechanism both for automatically increasing the torque of the carrier motor when the said mechanism is operated to raise the breech of the gun and for decreasing the torque of the carrier motor when the said mechanism is operated to lower the breech of the gun.

11. In ordnance apparatus, the combination of an ammunition carrier, a gun, a motor for raising the carrier, a motor for raising or lowering the breech of the gun, controlling mechanism for the gun motor, sectional resistance for the carrier motor, a controller switch for the carrier motor, a regulator having contacts varied in accordance with the movement of the breech of the gun upward or downward, means whereby the carrier motor holds the carrier opposite the breech of the gun with part of the sectional resistance in circuit therewith, means operative to short-circuit part of the said sectional resistance when the gun motor controlling mechanism is operated to cause the breech of the gun to be raised, and means whereby additional resistance is inserted in circuit with the carrier motor when the gun motor controlling mechanism is operated to cause the breech of the gun to be lowered.

12. In ordnance apparatus, the combination of an ammunition carrier, a gun, a motor for raising the carrier, a motor for raising or lowering the breech of the gun, a switch for effecting the operation of the gun motor in either direction, resistance for the carrier motor, an electro-magnet operative when energized to short-circuit a portion of the said resistance, and means in connection with the said switch whereby the electro-magnet is energized only when the gun motor is raising the breech of the gun.

13. In ordnance apparatus, the combination of an ammunition carrier, a gun, a motor for raising the carrier, a motor for raising or lowering the breech of the gun, a switch for effecting the operation of the gun motor in either direction, resistance for the carrier motor, an electromagnet operative to short-circuit a portion of the said resistance when the said switch is operated to cause the gun motor to raise the breech of the gun, another electro-magnet operative to insert resistance in circuit with the carrier motor when the said switch is operated to effect the lowering of the breech of the gun, and means for preventing the energization of the said magnets when the said carrier is descending.

14. In ordnance apparatus, the combination of an ammunition carrier, a gun, a motor for raising the carrier, a motor for raising or lowering the breech of the gun, a switch for effecting the operation of the gun motor in either direction, resistance for the carrier motor, an electro-responsive switch normally open controlled by the gun motor switch and operative when closed to short-circuit a portion of the said resistance, another electro-responsive switch normally closed controlled by the gun motor switch and operative when opened to insert resistance in circuit with the carrier motor, and means for rendering the said electro-responsive switches ineffective when the carrier motor is operated at or near full speed.

In testimony whereof, we have signed our names to this specification in the presence of two subscribing witnesses.

JOHN D. IHLDER.
WILLIAM D. LUTZ.

Witnesses:
C. BLINN,
CLINTON B. BROWN.

Copies of this patent may be obtained for five cents each, by addressing the "Commissioner of Patents, Washington, D. C."